United States Patent
Tsuda et al.

(10) Patent No.: US 8,652,990 B2
(45) Date of Patent: Feb. 18, 2014

(54) METHOD FOR PRODUCING CATALYST FOR PURIFICATION OF EXHAUST GAS

(71) Applicant: Suzuki Motor Corporation, Shizuoka-ken (JP)

(72) Inventors: Toyofumi Tsuda, Shizuoka-ken (JP); Fumikazu Kimata, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/751,500

(22) Filed: Jan. 28, 2013

(65) Prior Publication Data

US 2013/0203587 A1 Aug. 8, 2013

(30) Foreign Application Priority Data

Feb. 6, 2012 (JP) ................................. 2012-023108

(51) Int. Cl.
*B01J 23/10* (2006.01)

(52) U.S. Cl.
USPC ........................................................ 502/304

(58) Field of Classification Search
USPC ................................................ 502/339, 325
See application file for complete search history.

(56) References Cited

U.S. PATENT DOCUMENTS

| 5,578,283 A * | 11/1996 | Chen et al. ................ 423/240 R |
| 2011/0027385 A1* | 2/2011 | Cairns et al. .................. 424/618 |
| 2012/0289400 A1 | 11/2012 | Tsuda et al. |

FOREIGN PATENT DOCUMENTS

JP 2012-236117 A 12/2012

OTHER PUBLICATIONS

Sigma Aldrich, Ammonium Hydroxide Product Information, Feb. 3, 2003. www.sigma-aldrich.com, Product Code 22,122-8.*

* cited by examiner

*Primary Examiner* — Colleen Dunn
*Assistant Examiner* — Haytham Soliman
(74) *Attorney, Agent, or Firm* — Myers Bigel Sibley & Sajovec, P.A.

(57) ABSTRACT

Provided is a method for producing a catalyst for purification of exhaust gas, including the steps of: adding Zr ions to a solution containing a platinum hydroxide polymer; diluting the solution to which the Zr ions are added by using an aqueous ammonium acetate solution; immersing a support made of $Al_2O_3$, $SiO_2$, $CeO_2$, $ZrO_2$, or a composite oxide of any ones of these oxides in the diluted solution, followed by heating at 60 to 70° C., to thereby support the platinum hydroxide polymer on the support; and calcining the support, on which the platinum hydroxide polymer is supported, at 150 to 800° C.

4 Claims, 2 Drawing Sheets

METHOD FOR PRODUCING CATALYST FOR PURIFICATION OF EXHAUST GAS

RELATED APPLICATION

This application claims priority from Japanese Patent Application No. 2012-023108, filed Feb. 6, 2012, the disclosure of which is incorporated by reference herein in its entirety.

FIELD AND BACKGROUND OF THE INVENTION

The present invention relates to a method for producing a catalyst for purification of exhaust gas of an internal combustion engine.

Catalysts for automobiles have a function to decompose and remove hydrocarbons (HCs), nitrogen oxides ($NO_x$), and carbon monoxide (CO), which are harmful components in exhaust gas. Such a catalyst is produced by using, as a substrate, an inorganic material such as cordierite or a metal formed into a honeycomb shape. The harmful components are decomposed and removed when exhaust gas passes through the inside of the catalyst. To increase the contact efficiency of the catalyst with exhaust gas, the surface of the substrate is coated with a porous inorganic material, and furthermore, a trace amount of a noble metal is supported as an active component on a surface layer portion of the porous inorganic material. A platinum group metal such as platinum, palladium, or rhodium is used as the noble metal.

Recently, in order to rapidly treat exhaust gas at the ignition of an automobile engine, there has been a need for activation of the catalyst even at low-temperatures. In this respect, improvement of purification performance (low-temperature activity) has been attempted by increasing the amount of the noble metal. However, the increase in the amount of the expensive noble metal leads to increase in costs of automobiles, and is disadvantageous to consumers. Hence, there has been a need for improvement in purification performances without increase in the amount of the noble metal.

A platinum hydroxide polymer is a hydroxide in which platinum atoms are cross-linked with about several to several tens of oxygen atoms. For preparation of the platinum hydroxide polymer, hydrogen hexahydroxoplatinate ($H_2Pt(OH)_6$) is used as a raw material. The platinum hydroxide polymer is formed as follows. Specifically, hydrogen hexahydroxoplatinate is caused to be present in the form of a hydroxo complex by being dissolved in a strong acid solution, and then the complex is subjected to influence of protons from the acid to thereby form reactive monomers and, in turn, to cause a polymerization reaction. Since the polymerization reaction proceeds rapidly, it is difficult to perform control during the reaction. However, when the acid concentration, the reaction temperature, and the raw material concentration are set to satisfy specific conditions, the polymer turns into a metastable state under which the polymer has a degree of polymerization depending on the conditions, and under which the reaction is temporarily stopped. In addition, since the polymerization reaction is irreversible, the polymerization state can be maintained even when the temperature is lowered from the reaction temperature. The number of platinum atoms contained in a polymer varies among platinum hydroxide polymers prepared as described above, depending on the degree of polymerization. Hence, it is possible to use this polymer, for example, as a precursor material for controlling a particle diameter of the noble metal for an exhaust gas catalyst or the like.

However, the platinum hydroxide polymer has a low adsorption ratio on a support made of alumina ($Al_2O_3$), a ceria ($CeO_2$)/zirconia ($ZrO_2$)-based composite oxide, or the like. Hence, it is difficult to support a desired amount of platinum by use of the platinum hydroxide polymer. For this reason, it is difficult to use a solution containing the platinum hydroxide polymer as a material for a catalyst produced in a large quantity.

Japanese Patent Application No. 2011-105106 reports a solution containing a platinum hydroxide polymer having a controlled particle size, and a solution with a stabilized polymer size obtained by adding Zr ions to the above solution. When any of these solutions is used as it is, the platinum hydroxide polymer is not readily adsorbed on a support, and only part of the platinum in the solution is adsorbed on the support. For this reason, a platinum-supporting catalyst can be obtained only by a method (water-absorption-supporting method) in which a support is immersed in a solution having a high platinum concentration for several minutes, and the support in which the solution is absorbed is calcined.

However, when platinum is supported by the water-absorption-supporting method, it is difficult to make an amount of water absorbed constant. Moreover, even a slight difference in the amount of water absorbed leads to a large difference in the amount of platinum supported, because a solution having a high platinum concentration is used. In addition, since at least part of the platinum is adsorbed on the support when the support is immersed in the platinum solution, the platinum is supported in a larger amount than an amount of platinum supported which is estimated from the amount of water absorbed. Hence, it is difficult to support a desired amount of platinum by the water-absorption-supporting method, and it is difficult to use a solution containing a platinum hydroxide polymer as a material for a catalyst produced in a large quantity.

Moreover, the platinum hydroxide solution used in the water-absorption-supporting method has a very high acidity with a pH value of 0 or lower. For this reason, when a support in a honeycomb shape is immersed in the platinum hydroxide solution, the platinum hydroxide solution inflicts damage on the support, such as deterioration in the mechanical strength of the substrate due to elution of the cordierite component of the substrate.

On the other hand, when a support made of alumina, ceria/zirconia-based composite oxide, or the like is immersed in a dilute dinitro diamine platinum solution, which is widely used as a solution for supporting platinum, for a whole day and night, almost the entire amount of platinum in the solution adsorbs on the support. A platinum-supporting catalyst can be obtained by calcining this support (impregnation-supporting method). Hence, the impregnation-supporting method using a dinitro diamine platinum solution makes it possible to obtain a catalyst on which platinum is supported in a desired amount controlled by changing the platinum concentration in the solution, the amount of the solution, and the like, as appropriate.

SUMMARY OF THE INVENTION

The present invention has been made in view of the above-described circumstances, and an object of the present invention is to provide a method for producing a catalyst for purification of exhaust gas, the method making it possible to greatly improve the productivity by achieving a high adsorption ratio of platinum on a support, and avoid damage on the support due to a strong acid.

To solve the above-described problems, the present inventors have found that the adsorption ratio of platinum on a support is improved when the support is immersed in a solution containing a platinum hydroxide polymer, followed by heating at about 60 to 70° C. Moreover, the present inventors have found that further improvement in the adsorption ratio of platinum requires that the pH of the dilute solution be within about a slightly acidic to neutral range with a pH value of about 5 to 7, in addition to the heating.

Specifically, the present invention provides a method for producing a catalyst for purification of exhaust gas, comprising the steps of:

adding Zr ions to a solution containing a platinum hydroxide polymer;

diluting the solution to which the Zr ions are added by using an aqueous ammonium acetate solution;

immersing a support made of $Al_2O_3$, $SiO_2$, $CeO_2$, $ZrO_2$, or a composite oxide of any ones of these oxides in the diluted solution, followed by heating at 60 to 70° C., to thereby support the platinum hydroxide polymer on the support; and calcining the support, on which the platinum hydroxide polymer is supported, at 150 to 800° C.

In the adding step, the Zr ions are added preferably at a Zr/Pt ratio of 5.0 to 40 in terms of molar concentration ratio. In the diluting step, the concentration of the aqueous ammonium acetate solution is preferably 0.5 mol/L or higher.

The Zr/Pt ratio is preferably 5.0 to 20 in terms of molar concentration ratio, and the concentration of the aqueous ammonium acetate solution is preferably 1.0 mol/L or higher.

The addition of the Zr ions is preferably performed by using a zirconium oxynitrate solution or a zirconium acetate solution.

DESCRIPTION OF THE EMBODIMENTS OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

The method for producing a catalyst for purification of exhaust gas of the present invention makes it possible to greatly improve the productivity by achieving a high adsorption ratio of platinum hydroxide polymer on a support, and avoid damage on the support due to a strong acid.

First, a solution containing a platinum hydroxide polymer is prepared. The platinum hydroxide polymer can be obtained by a polymerization reaction of hydrogen hexahydroxoplatinate, which serves as a raw material, in an acidic solution.

The acidic solution is not particularly limited, and, for example, a solution prepared at an acid concentration of 4.5 to 6.5 mol/L, and preferably 6.0 mol/L can be used as the acidic solution. For example, nitric acid, sulfuric acid, hydrochloric acid, or the like can be used, and nitric acid can be preferably used. This is because an acid concentration in this range enables dissolution of platinum serving as the raw material. This is also because of the following reason. Specifically, sulfuric acid and hydrochloric acid may lead to deterioration in performances, because anion-derived components in the solution remain in a catalyst after calcination, whereas nitric acid does not cause such deterioration in performance, because its anion-derived components are removed during calcination.

Hydrogen hexahydroxoplatinate can be added to the acidic solution, for example, at a platinum concentration of 4 to 20 g/L, and preferably 12 to 14 g/L. This is because a platinum concentration in this range enables dissolution of platinum in the acidic solution having the acid concentration selected as above, and also enables a favorable polymerization control in a reaction temperature region to be described later.

A reaction temperature is, for example, in a range from 50 to 80° C., and is preferably 70° C. This is because the polymerization reaction does not proceed excessively in this temperature range, so that the platinum hydroxide polymer is monodispersed as fine particles in the solution, and hence a stable state can be maintained.

A size (particle diameter) of the platinum hydroxide polymer is preferably 60 nm or less, and more preferably in a range from 20 to 50 nm. A size in this range enables a stable state to be maintained not only in the acidic solution, but also in a dilute solution (to be described later). Dynamic light scattering (DLS) or the like can be used as a method for measuring the particle diameter, for example. Note that a numeric value of the particle diameter used herein is a value measured based on DLS intensity. This is because a value measured based on the intensity is highly reproducible owing to the characteristics of DLS. A value measured based on the intensity is expressed as a greater value than the actual particle diameter (about 6 to 8 times the actual particle diameter). For example, when a value measured based on the intensity is 20 to 60 nm, the actual particle diameter is 3 to 7 nm.

Next, Zr ions are added to the obtained solution containing the platinum hydroxide polymer. The addition of the Zr ions makes it possible to inhibit the polymerization reaction of the platinum hydroxide polymer, so that turbidity and precipitation become less likely to occur in the solution.

A platinum hydroxide polymer present in a solution is positively charged. Hence, when another cation species, which is positively charged, coexists with the platinum hydroxide polymer in the solution, an electrostatic repulsive force is generated between the platinum hydroxide polymer and the cation species. Since this electrostatic repulsive force restricts the movement of the platinum hydroxide polymer, the opportunity for collision of platinum hydroxide polymer molecules is reduced. For this reason, the polymerization reaction rate of the platinum hydroxide polymer is greatly reduced, so that the stability of the platinum hydroxide polymer is improved. In addition, the higher the valence of the coexistent cation species is, the greater the electrostatic repulsive force generated between the cation species and the platinum hydroxide polymer is. Hence, the stability as described above can be obtained by a small addition amount.

The coexisting cations need to be selected as appropriate depending on an application of the platinum hydroxide polymer. When platinum is supported on an exhaust gas catalyst by use of the above-described stabilized solution containing a platinum hydroxide polymer, it is necessary to select a substance which is less likely to adversely affect performances of the catalyst after the supporting, even when the added element (cations) remains on the support.

Zr is excellent in stabilizing the platinum hydroxide polymer in a solution, because Zr forms tetravalent cations in a solution. In addition, stabilization of the platinum hydroxide polymer in a solution with Ti or Hf can be expected, because Ti and Hf also form tetravalent cations in a solution. In an exhaust gas catalyst, Zr oxide is one of the major components constituting the exhaust gas catalyst, whereas small amounts of Ti and Hf are contained in the exhaust gas catalyst as impurities. Here, Zr ions are added to the solution containing the platinum hydroxide polymer, from the viewpoint of performances of the catalyst after the supporting.

The addition of the Zr ions is preferably performed by using a zirconium oxynitrate solution or a zirconium acetate solution. When counter anions of Zr are nitrate ions or acetate ions, the counter anions are removed from the support as a gas during calcination of the catalyst. In addition, also when a zirconium sulfate solution or a zirconium chloride solution is used, stabilization of the platinum hydroxide polymer in the solution as described above can be expected. However, it is desirable to use a zirconium oxynitrate solution or a zirconium acetate solution from the viewpoint of performances of the catalyst after the supporting.

The Zr/Pt ratio in the solution which contains the platinum hydroxide polymer and to which the Zr ions are added is preferably 5.0 to 40, and more preferably 5.0 to 20 in terms of molar concentration ratio. When the Zr/Pt ratio is within this concentration range, an initial size of the prepared platinum hydroxide polymer is maintained, so that turbidity and precipitation are less likely to occur in the solution, and the possibility of reducing the platinum concentration is also low. In addition, the solution which contains the platinum hydroxide polymer and to which the Zr ions are added can be diluted by using an aqueous ammonium acetate solution (to be described later), so that a desired platinum concentration can be obtained. Note that when the Zr/Pt ratio exceeds 20 in terms of molar concentration ratio, platinum can be adsorbed on a support at a high adsorption ratio of 80% or higher, but precipitation of zirconium hydroxide occurs in some cases. Moreover, when the support on which platinum is adsorbed has a honeycomb shape, the precipitate of zirconium hydroxide needs to be removed from the support in some cases before a calcination step (to be described later), in order to prevent blocking of the honeycomb due to the precipitate of zirconium hydroxide.

Next, the solution to which Zr ions are added is diluted by using an aqueous ammonium acetate solution. Because of the buffering effect of the aqueous ammonium acetate solution, the diluted solution is slightly acidic with a pH value of about 5 to 7. Hence, it is possible to avoid the damage on the support due to the strong acid, which is the problem occurring in the water-absorption-supporting method conducted by using a solution containing a platinum hydroxide polymer at a high concentration. Moreover, ammonium acetate does not remain in a catalyst after calcination, because the ammonium acetate is removed as a gas from the support during the calcination (to be described later).

The concentration of the aqueous ammonium acetate solution is preferably 0.5 mol/L or greater, and more preferably 1.0 mol/L or greater. A value of 4.0 mol/L is sufficient as the upper limit of the concentration of the aqueous ammonium acetate solution. Note that if the concentration of the aqueous ammonium acetate solution is less than 1.0 mol/L, precipitation of zirconium hydroxide may occur in some cases, although platinum can be adsorbed on the support at a high adsorption ratio of 80% or higher. In addition, when the support on which platinum is adsorbed has a honeycomb shape, it is necessary, in some cases, to remove the precipitate of zirconium hydroxide from the support before a calcination step (to be described later), in order to prevent blocking of the honeycomb due to the precipitate of zirconium hydroxide. If the concentration of the aqueous ammonium acetate solution exceeds 4.0 mol/L, it is difficult to perform the impregnation-supporting on the honeycomb support in some cases, because of increase of the probability of the precipitation of zirconium hydroxide, or increase in viscosity.

It is most preferable that the Zr/Pt ratio in the solution which contains the platinum hydroxide polymer and to which the Zr ions are added be set to 5.0 to 20, and the concentration of the aqueous ammonium acetate solution be set to 1.0 mol/L or greater. Within these ranges, no precipitation of zirconium hydroxide occurs, and it is possible to cause platinum to adsorb on the support at a high adsorption ratio of 90% or greater.

Note that even when a solution which contains a platinum hydroxide polymer and to which Zr ions are added in advance, for example, at a Zr/Pt ratio of 2.0, for stabilization of the platinum hydroxide polymer is diluted by using an aqueous ammonium acetate solution, and then used as the solution for impregnation, this solution can be used as the solution for impregnation-supporting after Zr ions are further added to achieve a concentration within the above-described concentration range before the above-described dilution.

Next, a support made of $Al_2O_3$, $SiO_2$, $CeO_2$, $ZrO_2$, or a composite oxide of any of these oxides is immersed in the diluted solution, and then heated at 60 to 70° C. Thus, the platinum hydroxide polymer is supported on the support. This enables improvement in the adsorption ratio of platinum on the support to 80% or greater, and makes it possible to prepare a platinum catalyst in which the platinum hydroxide polymer is supported by the impregnation-supporting method. The impregnation-supporting method enables easy control of the amount of platinum supported, and hence greatly improves the productivity as compared with the water-absorption-supporting method. Note that the support made of $Al_2O_3$, $SiO_2$, $CeO_2$, $ZrO_2$, or a composite oxide of any of these oxides encompasses each of $Al_2O_3$, $SiO_2$, $CeO_2$, and $ZrO_2$; combinations of two kinds of $Al_2O_3$, $SiO_2$, $CeO_2$, and $ZrO_2$; combinations of three kinds of $Al_2O_3$, $SiO_2$, $CeO_2$, and $ZrO_2$; and combinations of all $Al_2O_3$, $SiO_2$, $CeO_2$, and $ZrO_2$.

In general, when a solution containing a platinum hydroxide polymer is heated, bond formation (reaction) between molecules of the platinum hydroxide polymer is accelerated. Hence, the grain growth of the platinum hydroxide polymer excessively proceeds, and the platinum hydroxide polymer separates from the solution as turbidity or precipitate. In contrast, the present inventors have found that the bond formation (reaction) between a platinum hydroxide polymer and a support is also accelerated by immersing the support in a solution containing the platinum hydroxide polymer, followed by heating at about 60 to 70° C., so that the adsorption ratio of platinum on the support is improved as compared with a case of immersion at room temperature. However, under a high acidic condition with a negative pH value, the adsorption ratio is improved by the heating, but the adsorption ratio is not improved to an extent that the solution can be used in an impregnation-supporting method. Even heating of the solution containing a platinum hydroxide polymer to a higher temperature does not lead to a sufficient improvement in adsorption ratio, because the platinum hydroxide polymer separates from the solution as turbidity or precipitate.

Further improvement of the adsorption ratio of the platinum hydroxide polymer requires that the pH of the diluted solution be within about a slightly acidic to neutral range with a pH value of about 5 to 7, in addition to the above-described heating. In the present invention, an aqueous ammonium acetate solution, which exhibits a buffering effect within about the slightly acidic to range, is employed. The solution containing the platinum hydroxide polymer is diluted with the aqueous ammonium acetate solution, and it is then used as the solution for impregnation. Note that, for stabilization of the platinum hydroxide polymer, it is necessary to add Zr ions before the dilution using the aqueous ammonium acetate solution as described above. Without the addition of the Zr ions, the platinum hydroxide polymer separates from the solution as turbidity or precipitate immediately after the dilution.

Next, the support, on which the platinum hydroxide polymer is supported, is calcined at 150 to 800° C. The calcination temperature is preferably 400 to 600° C. In addition, the calcination time is 0.3 to 5 hours, and preferably 0.5 to 2 hours. These are because, within these ranges, platinum can be supported stably, and almost no thermal degradation occurs due to the heating.

A platinum-supporting catalyst for purification of exhaust gas can be obtained through the above-described steps.

As described above, the method for producing a catalyst for purification of exhaust gas of the present invention makes it possible to greatly improve the productivity by achieving a high adsorption ratio of platinum on a support, and avoid damage on the support due to a strong acid.

Hereinafter, the present invention is described specifically by showing examples and the like. However, the present invention is not limited to the examples and the like.

EXAMPLES

Preparation of Solution Containing Platinum Hydroxide Polymer

Into 100 mL of a 6.0 mol/L nitric acid solution, 2.16 g of hydrogen hexahydroxoplatinate (manufactured by Tanaka Kikinzoku Kogyo K. K., platinum: 65 wt %) was dissolved to obtain a platinum concentration of 14 g/L, and the solution was held at 70° C. for 22 hours. Thus, a solution containing a platinum hydroxide polymer was obtained.

The prepared solution was measured by dynamic light scattering (DLS: Zetasizer manufactured by Sysmex Corporation). As a result, the size of the platinum hydroxide polymer was estimated to be 40 nm on the basis of intensity.

Example 1

To 0.71 ml of the solution containing the platinum hydroxide polymer having the controlled particle diameter, 0.08 ml of a zirconium oxynitrate solution having a Zr concentration of 3.1 mol/L was added to obtain a Zr/Pt ratio (molar concentration ratio) of 5. Then, the solution was diluted to 20 ml with a 0.5 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 2

To 0.71 ml of the solution containing the platinum hydroxide polymer having the controlled particle diameter, 0.08 ml of a zirconium oxynitrate solution having a Zr concentration of 3.1 mol/L was added to obtain a Zr/Pt ratio (molar concentration ratio) of 5. Then, the solution was diluted to 20 ml with a 1.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 3

To 0.71 ml of the solution containing the platinum hydroxide polymer having the controlled particle diameter, 0.08 ml of a zirconium oxynitrate solution having a Zr concentration of 3.1 mol/L was added to obtain a Zr/Pt ratio (molar concentration ratio) of 5. Then, the solution was diluted to 20 ml with a 2.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 4

To 0.71 ml of the solution containing the platinum hydroxide polymer having the controlled particle diameter, 0.17 ml of a zirconium oxynitrate solution having a Zr concentration of 3.1 mol/L was added to obtain a Zr/Pt ratio (molar concentration ratio) of 10. Then, the solution was diluted to 20 ml with a 0.5 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 5

To 0.71 ml of the solution containing the platinum hydroxide polymer having the controlled particle diameter, 0.17 ml of a zirconium oxynitrate solution having a Zr concentration of 3.1 mol/L was added to obtain a Zr/Pt ratio (molar concentration ratio) of 10. Then, the solution was diluted to 20 ml with a 1.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 6

To 0.71 ml of the solution containing the platinum hydroxide polymer having the controlled particle diameter, 0.17 ml of a zirconium oxynitrate solution having a Zr concentration of 3.1 mol/L was added to obtain a Zr/Pt ratio (molar concentration ratio) of 10. Then, the solution was diluted to 20 ml with a 2.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 7

To 0.71 ml of the solution containing the platinum hydroxide polymer having the controlled particle diameter, 0.25 ml of a zirconium oxynitrate solution having a Zr concentration of 3.1 mol/L was added to obtain a Zr/Pt ratio (molar concentration ratio) of 15. Then, the solution was diluted to 20 ml with a 0.5 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 8

To 0.71 ml of the solution containing the platinum hydroxide polymer having the controlled particle diameter, 0.25 ml of a zirconium oxynitrate solution having a Zr concentration of 3.1 mol/L was added to obtain a Zr/Pt ratio (molar concentration ratio) of 15. Then, the solution was diluted to 20 ml with a 1.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 9

To 0.71 ml of the solution containing the platinum hydroxide polymer having the controlled particle diameter, 0.25 ml of a zirconium oxynitrate solution having a Zr concentration of 3.1 mol/L was added to obtain a Zr/Pt ratio (molar concentration ratio) of 15. Then, the solution was diluted to 20 ml with a 2.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 10

To 0.71 ml of the solution containing the platinum hydroxide polymer having the controlled particle diameter, 0.33 ml of a zirconium oxynitrate solution having a Zr concentration of 3.1 mol/L was added to obtain a Zr/Pt ratio (molar concentration ratio) of 20. Then, the solution was diluted to 20 ml with a 0.5 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 11

To 0.71 ml of the solution containing the platinum hydroxide polymer having the controlled particle diameter, 0.33 ml of a zirconium oxynitrate solution having a Zr concentration of 3.1 mol/L was added to obtain a Zr/Pt ratio (molar concentration ratio) of 20. Then, the solution was diluted to 20 ml with a 1.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 12

To 0.71 ml of the solution containing the platinum hydroxide polymer having the controlled particle diameter, 0.33 ml of a zirconium oxynitrate solution having a Zr concentration of 3.1 mol/L was added to obtain a Zr/Pt ratio (molar concentration ratio) of 20. Then, the solution was diluted to 20 ml with a 2.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and it was held at 60° C. for 6 hours and then at 70° C. for 18 hours.

Example 13

To 0.71 ml of the solution containing the platinum hydroxide polymer having the controlled particle diameter, 0.41 ml of a zirconium oxynitrate solution having a Zr concentration of 3.1 mol/L was added to obtain a Zr/Pt ratio (molar concentration ratio) of 25. Then, the solution was diluted to 20 ml with a 0.5 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 14

To 0.71 ml of the solution containing the platinum hydroxide polymer having the controlled particle diameter, 0.41 ml of a zirconium oxynitrate solution having a Zr concentration of 3.1 mol/L was added to obtain a Zr/Pt ratio (molar concentration ratio) of 25. Then, the solution was diluted to 20 ml with a 1.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 15

To 0.71 ml of the solution containing the platinum hydroxide polymer having the controlled particle diameter, 0.41 ml of a zirconium oxynitrate solution having a Zr concentration of 3.1 mol/L was added to obtain a Zr/Pt ratio (molar concentration ratio) of 25. Then, the solution was diluted to 20 ml with a 2.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 16

To 0.71 ml of the solution containing the platinum hydroxide polymer having the controlled particle diameter, 0.66 ml of a zirconium oxynitrate solution having a Zr concentration of 3.1 mol/L was added to obtain a Zr/Pt ratio (molar concentration ratio) of 40. Then, the solution was diluted to 20 ml with a 0.5 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 17

To 0.71 ml of the solution containing the platinum hydroxide polymer having the controlled particle diameter, 0.66 ml of a zirconium oxynitrate solution having a Zr concentration of 3.1 mol/L was added to obtain a Zr/Pt ratio (molar concentration ratio) of 40. Then, the solution was diluted to 20 ml with a 1.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Example 18

To 0.71 ml of the solution containing the platinum hydroxide polymer having the controlled particle diameter, 0.66 ml of a zirconium oxynitrate solution having a Zr concentration of 3.1 mol/L was added to obtain a Zr/Pt ratio (molar concentration ratio) of 40. Then, the solution was diluted to 20 ml with a 2.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Comparative Example 1

Without the addition of the zirconium oxynitrate solution having a Zr concentration of 3.1 mol/L, 0.71 ml of the solution containing the platinum hydroxide polymer having the controlled particle diameter was diluted to 20 ml with a 1.0 mol/L aqueous ammonium acetate solution by use of a volumetric flask. Thus, a solution for impregnation having a platinum concentration of 0.5 g/L was prepared.

Comparative Example 2

To 0.71 ml of the solution containing the platinum hydroxide polymer having the controlled particle diameter, 0.83 ml of a zirconium oxynitrate solution having a Zr concentration of 3.1 mol/L was added to obtain a Zr/Pt ratio (molar concentration ratio) of 50. Then, the solution was diluted to 20 ml with a 0.5 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Comparative Example 3

To 0.71 ml of the solution containing the platinum hydroxide polymer having the controlled particle diameter, 0.83 ml of a zirconium oxynitrate solution having a Zr concentration of 3.1 mol/L was added to obtain a Zr/Pt ratio (molar concentration ratio) of 50. Then, the solution was diluted to 20 ml with a 1.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Comparative Example 4

To 0.71 ml of the solution containing the platinum hydroxide polymer having the controlled particle diameter, 0.83 ml of a zirconium oxynitrate solution having a Zr concentration of 3.1 mol/L was added to obtain a Zr/Pt ratio (molar concentration ratio) of 50. Then, the solution was diluted to 20 ml with a 2.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Comparative Example 5

To 0.71 ml of the solution containing the platinum hydroxide polymer having the controlled particle diameter, 0.33 ml of a zirconium oxynitrate solution having a Zr concentration of 3.1 mol/L was added to obtain a Zr/Pt ratio (molar concentration ratio) of 20. Then, the solution was diluted to 20 ml with a 2.0 mol/L aqueous ammonium acetate solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at room temperature for 24 hours.

Comparative Example 6

Without the addition of the zirconium oxynitrate solution having a Zr concentration of 3.1 mol/L, 0.71 ml of the solution containing the platinum hydroxide polymer having the controlled particle diameter was diluted to 20 ml with a 6.0 mol/L nitric acid solution by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Comparative Example 7

To 0.71 ml of the solution containing the platinum hydroxide polymer having the controlled particle diameter, 0.33 ml of a zirconium oxynitrate solution having a Zr concentration of 3.1 mol/L was added to obtain a Zr/Pt ratio (molar concentration ratio) of 20. Then, the solution was diluted to 20 ml with ion-exchanged water by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at 60° C. for 6 hours and then at 70° C. for 18 hours.

Comparative Example 8

With ion-exchanged water, 0.10 ml of a dinitro diamine platinum solution having a platinum concentration of 102 g/L was diluted to 20 ml by use of a volumetric flask. Thus, a solution for impregnation-supporting having a platinum concentration of 0.5 g/L was prepared. As a support, 4.0 g of a $CeO_2$—$ZrO_2$-based composite oxide powder was immersed in the prepared solution for impregnation, and held at room temperature for 24 hours.

Table 1 shows the conditions of the experiments in Examples 1 to 18 and Comparative Examples 1 to 4, and Table 2 shows the conditions of the experiments in Comparative Examples 5 to 8.

TABLE 1

| | | Ammonium acetate concentration (mol/L) | | |
|---|---|---|---|---|
| | | 2 | 1 | 0.5 |
| Zr/Pt ratio (molar concentration ratio) | 0 | — | Comp. Ex. 1 | — |
| | 5 | Example 1 | Example 2 | Example 3 |
| | 10 | Example 4 | Example 5 | Example 6 |
| | 15 | Example 7 | Example 8 | Example 9 |
| | 20 | Example 10 | Example 11 | Example 12 |
| | 25 | Example 13 | Example 14 | Example 15 |
| | 40 | Example 16 | Example 17 | Example 18 |
| | 50 | Comp. Ex. 2 | Comp. Ex. 3 | Comp. Ex. 4 |

TABLE 2

| | Pt solution | Zr addition | Dilution | Temperature for impregnation-supporting |
|---|---|---|---|---|
| Comp. Ex. 5 | Platinum hydroxide polymer | Zr/Pt = 20 | 1 mol/L ammonium acetate | Room temperature, 24 h |
| Comp. Ex. 6 | Platinum hydroxide polymer | Without addition | 6 mol/mL nitric acid | 60° C., 6 h → 70° C., 18 h |
| Comp. Ex. 7 | Platinum hydroxide polymer | Zr/Pt = 20 | Ion-exchanged water | 60° C., 6 h → 70° C., 19 h |
| Comp. Ex. 8 | Dinitro diamine platinum | Without addition | Ion-exchanged water | Room temperature, 24 h |

(Relationships of Pt Adsorption Ratio with Amount of Zr Added and with Ammonium Acetate)

Figure 1:
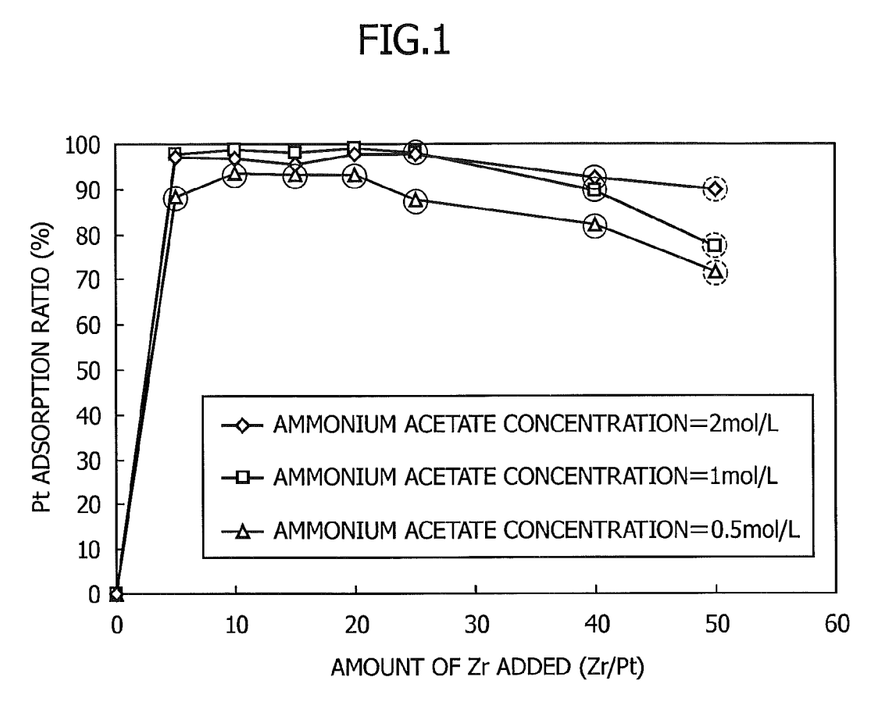
FIG. 1 is a graph showing the relationships of Pt adsorption ratio with amount of Zr added and with ammonium acetate in Examples 1 to 18 and Comparative Examples 1 to 4.

Pt adsorption ratios of the supports obtained in Examples 1 to 18 and Comparative Examples 1 to 4 were calculated. FIG. 1 shows the calculation results. The concentrations of platinum in each of the solutions for impregnation-supporting before and after the impregnation-supporting were measured by ICP-AES, and the Pt adsorption ratio was calculated from the ratio of the measured values based on the following formula (Formula 1):

Pt adsorption ratio(%)=(1−Pt concentration after impregnation-supporting/Pt concentration before impregnation-supporting)×100        (Formula 1)

As shown in FIG. 1, the Pt adsorption ratios in Examples 1 to 18 were as high as approximately 80% or higher. Precipitation of zirconium hydroxide occurred in Examples 3, 6, 9, 12, 14, 15, 16, 17, and 18 (portions encircled by solid lines in FIG. 1). Hence, it is possible to cause the platinum hydroxide polymer to adsorb on a honeycomb-shaped support at a high Pt adsorption ratio by using a solution for impregnation having the same composition as that of any one of Examples 3, 6, 9, 12, 14, 15, 16, 17, and 18, but the precipitate of zirconium hydroxide needs to be removed before the calcination, in order to prevent the blocking of the honeycomb. In Examples 1, 2, 4, 5, 7, 8, 10, 11, and 13, the Pt adsorption ratios were as high as approximately 90% or higher, and moreover no precipitation of zirconium hydroxide occurred. Hence, it was demonstrated that these conditions are adequate to impregnation-supporting of a platinum hydroxide polymer. On the other hand, in Comparative Examples 2, 3, and 4 (portions encircled by broken lines in FIG. 1), the Pt adsorption ratios were low, and large amounts of precipitate of zirconium hydroxide were formed. Note that, in Comparative Example 1, the platinum hydroxide polymer separated from the solution as precipitate immediately after the dilution with the 1 mol/L aqueous ammonium acetate solution, and hence the solution was not successfully used as a solution for impregnation-supporting.

(Relationships of Pt Adsorption Ratio with Solution for Dilution and with Temperature for Impregnation-Supporting)

Figure 2:
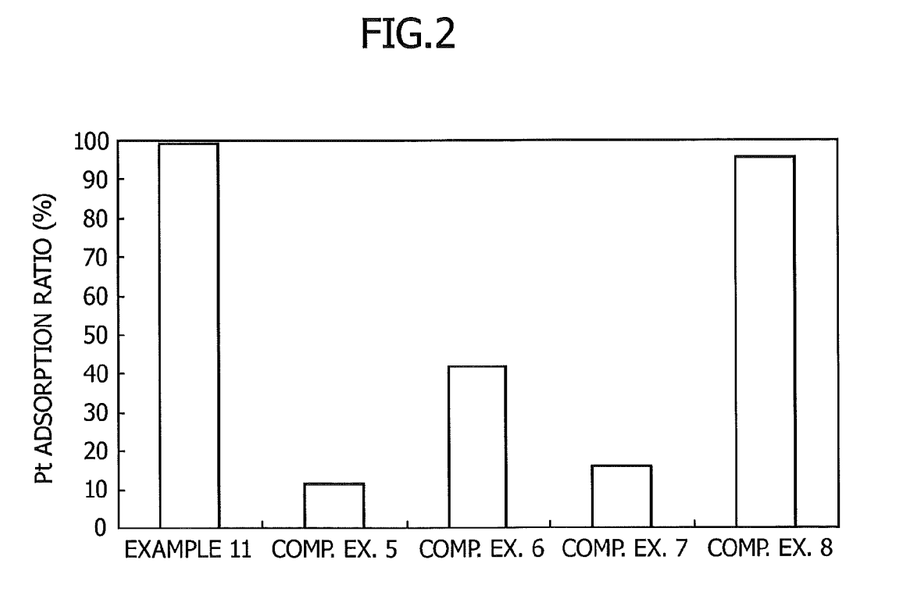
FIG. 2 is a graph showing the relationships of Pt adsorption ratio with solution for dilution and with temperature for impregnation-supporting in Example 11 and Comparative Examples 5 to 8.

The Pt adsorption ratios of the supports obtained in Example 11 and Comparative Examples 5 to 8 were calculated. FIG. 2 shows the calculation results. The Pt adsorption ratios were calculated by the same method as described above.

As shown in FIG. 2, the Pt adsorption ratio in Comparative Example 5 took a low value of approximately 10%. This result indicates that heating is necessary during the impregnation-supporting. The Pt adsorption ratio in Comparative Example 6 took a low value of approximately 40%. This result indicates that the acidity of the solution for impregnation-supporting needs to be reduced, because when the acidity of the solution for impregnation-supporting is high, the platinum hydroxide polymer is less likely to be adsorbed on a support irrespective of heating. The acidity in Comparative Example 7 was lower than in Comparative Example 6, because the dilution was performed by using ion-exchanged water in Comparative Example 7. However, since the platinum hydroxide polymer was stabilized by the addition of the Zr ions in Comparative Example 7, the Pt adsorption ratio in Comparative Example 7 was approximately 15%, and was lower than that of Comparative Example 6. This result indicates that the acidity of the solution for impregnation-supporting needs to be further reduced. On the other hand, the Pt adsorption ratios in Comparative Example 8 and Example 11 both took high values. These results indicate that a platinum hydroxide polymer can be used as a Pt source for impregnation-supporting, as in the case of a dinitro diamine platinum solution, which is generally and widely used for impregnation-supporting of platinum on a support. This is made possible by the method in which the platinum hydroxide polymer is stabilized by adding Zr ions to a solution containing the platinum hydroxide polymer; subsequently, the solution is diluted by using an aqueous ammonium acetate solution; and by using the obtained diluted solution as a solution for impregnation-supporting, a support is immersed in the solution for impregnation-supporting, followed by heating at 60 to 70° C.

(Evaluation of Catalytic Performances)

To check whether or not catalysts prepared by using the impregnation-supporting method were superior to a dinitro diamine platinum catalyst in terms of catalytic performances, catalytic performances were evaluated based on a model-gas test.

Example 19

To 1.07 ml of the solution containing the platinum hydroxide polymer having the controlled particle diameter, 0.50 ml of a zirconium oxynitrate solution having a Zr concentration of 3.1 mol/L was added to obtain a Zr/Pt ratio (molar concentration ratio) of 20. Then, the solution was diluted to 30 ml with a 1.0 mol/L aqueous ammonium acetate solution by use of a volumetric flask. Thus, a solution for impregnation-supporting having a platinum concentration of 0.5 g/L was prepared. As a support, a honeycomb support having a volume of 15 ml and being coated with a $CeO_2$—$ZrO_2$-based composite oxide was immersed in the prepared solution for impregnation, and held at 60° C. for 6 hours and then at 70° C. for 18 hours. Then, the support was calcined at 500° C. for 1 hour. The Pt adsorption ratio of the obtained catalyst was approximately 95%.

Comparative Example 9

With ion-exchanged water, 0.10 ml of a dinitro diamine platinum solution having a platinum concentration of 102 g/L was diluted to 30 ml by use of a volumetric flask. Thus, a solution for impregnation-supporting having a platinum concentration of 0.5 g/L was prepared. As a support, a honeycomb support having a volume of 15 ml and being coated with a $CeO_2$—$ZrO_2$-based composite oxide was immersed in the prepared solution for impregnation, held at room temperature for 24 hours, and then calcined at 500° C. for 1 hour. The Pt adsorption ratio of the obtained catalyst was approximately 95%.

Figure 3:
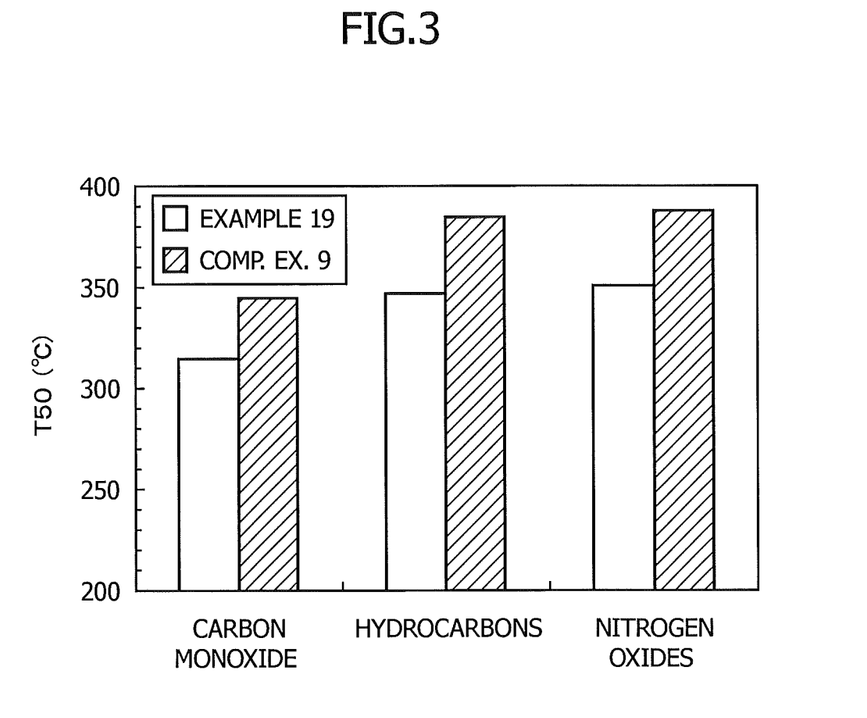
FIG. 3 is a graph in which comparisons between catalysts of Example 19 and Comparative Example 9 are made as to temperatures (T50s) at which removal ratios of components (carbon monoxide, hydrocarbon, and nitrogen oxide) reached 50%.

The catalysts prepared in Example 19 and Comparative Example 9 were subjected to an endurance treatment in an oven at 900° C. for 5 hours. Then, the temperature was raised at 30° C. per minute, while a model gas having the composition shown in Table 3 was caused to flow through each catalyst at SV=900001 $h^{-1}$. Evaluation of the catalytic performances was performed by comparing temperatures (T50s) at which the removal ratios of carbon monoxide, hydrocarbons, and nitrogen oxide reached 50%. A lower T50 value indicates a better catalytic activity. FIG. 3 shows the results. Note that each removal ratio was calculated by the following formula (Formula 2):

$$\text{Removal ratio}(\%) = (1 - \text{concentration in treated gas}/\text{concentration in untreated gas}) \times 100 \quad \text{(Formula 2)}$$

TABLE 3

| | Base gas | | | | | | Perturbation | | | |
|---|---|---|---|---|---|---|---|---|---|---|
| $N_2$ | $CO_2$ (%) | NO (ppm) | CO (%) | $C_3H_6$ (ppm) | $C_3H_8$ (ppm) | $H_2O$ (%) | $O_2$ (%) | CO (%) | $C_3H_6$ (ppm) | $C_3H_8$ (ppm) |
| Balance | 13.9 | 3367 | 0.29 | 393 | 196 | 10 | 1.51 | 2.19 | 272 | 136 |

(A/F = 14.6 ± 1, Perturbation frequency = 1 Hz)

From FIG. 3, the T50s of the components (carbon monoxide, hydrocarbons, and nitrogen oxide) achieved by the catalyst of Example 19 were all lower than those achieved by the catalyst of Comparative Example 9. These results indicate that the catalyst prepared by the impregnation-supporting method had catalytic performances superior to those of the dinitro diamine platinum catalyst.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. A method for producing a catalyst for purification of exhaust gas, comprising the steps of:
   adding Zr ions to a solution containing a platinum hydroxide polymer;
   diluting the solution to which the Zr ions are added by using an aqueous ammonium acetate solution wherein a pH value of the diluted solution is within about a slightly acidic to neutral range with the value of 5 to 7;
   immersing a support made of $Al_2O_3$, $SiO_2$, $CeO_2$, $ZrO_2$, or a composite oxide of any ones of these oxides in the diluted solution, while heating at 60 to 70° C., to thereby support the platinum hydroxide polymer on the support and to improve the adsorption ratio of the platinum on the support; and
   calcining the support, on which the platinum hydroxide polymer is supported, at 150 to 800° C.

2. The method for producing a catalyst for purification of exhaust gas according to claim 1, wherein
   in the adding step, the Zr ions are added at a Zr/Pt ratio of 5.0 to 40 in terms of molar concentration ratio, and
   in the diluting step, the concentration of the aqueous ammonium acetate solution is 0.5 mol/L or higher.

3. The method for producing a catalyst for purification of exhaust gas according to claim 2, wherein
   the Zr/Pt ratio is 5.0 to 20 in terms of molar concentration ratio, and
   the concentration of the aqueous ammonium acetate solution is 1.0 mol/L or higher.

4. The method for producing a catalyst for purification of exhaust gas according to claim 1, wherein
   the adding of the Zr ions is performed by using a zirconium oxynitrate solution or a zirconium acetate solution.

* * * * *